United States Patent [19]

Titus

[11] 4,338,044
[45] Jul. 6, 1982

[54] PREVENTION OF SLIDING OF A WEIGHT JACKET OVER THE CORROSION COATING OF A PIPE LINE

[75] Inventor: Paul E. Titus, Houston, Tex.

[73] Assignee: Shell Oil Company, Houston, Tex.

[21] Appl. No.: 134,357

[22] Filed: Mar. 27, 1980

Related U.S. Application Data

[63] Continuation-in-part of Ser. No. 972,840, Dec. 26, 1978, abandoned.

[51] Int. Cl.³ .............................................. F16L 1/04
[52] U.S. Cl. ..................................... 405/172; 405/167
[58] Field of Search ............... 405/167, 168, 172, 158; 138/176, 103, 141, 145, 154, 172

[56] References Cited

U.S. PATENT DOCUMENTS

| 592,017 | 10/1897 | McCauley et al. | 138/103 |
| 1,892,433 | 12/1932 | Huff | 138/145 |
| 2,401,092 | 5/1946 | Miller | 138/174 X |
| 3,164,874 | 1/1965 | Reark | 138/176 X |
| 3,206,851 | 9/1965 | Smith | 138/176 X |
| 3,658,222 | 4/1972 | Dressel et al. | 405/167 X |
| 3,955,600 | 5/1976 | Tamburello | 138/141 |

*Primary Examiner*—Dennis L. Taylor

[57] ABSTRACT

A method is provided for preventing sliding of a weight jacket on a pipe during tensioning of the pipe by disposing at least one spiral gripping means about the pipe, attaching at least one end of the gripping means to the pipe, and applying the weight jacket about the pipe and gripping means.

7 Claims, 4 Drawing Figures

PREVENTION OF SLIDING OF A WEIGHT JACKET OVER THE CORROSION COATING OF A PIPE LINE

REFERENCE TO RELATED APPLICATION

This application is a continuation-in-part of application Ser. No. 972,840, filed Dec. 26, 1978, now abandoned.

BACKGROUND OF THE INVENTION

Usually, empty coated pipe is buoyant in sea water, and a concrete weight jacket is added to provide sufficient weight to cause the pipe to sink and lay properly on the sea floor. When laid offshore from a vessel, the pipe is subjected to tension applied to minimize the angle of the sag bend on the sea floor. Tension is applied to the pipe through the weight jacket by "tensioners" or especially designed grips.

In another offshore pipe laying method, the pipe is made up on shore, and then pulled or dragged to its location on the sea floor, or river bed. In this case, tension is applied to the pipe, but resistance to moving is felt by the concrete weight jacket.

As the water depth increases, or the pipe lengths to be laid increases, the longitudinal force or sliding force on the weight jacket increases, and failure can occur by the sliding of the jacket over the pipe. This is particularly the case when the corrosion coat presents a smooth surface as do the relatively new synthetic polymeric coatings such as fusion bonded epoxy or polyethylene.

The following references are pertinent to the invention: Choate, L. C., "Feasibility Study of Applying Concrete Over External Thin Film Submarine Pipe Coatings", *Materials Performance*, pages 45-46, September, 1975; "Tests Show Tension Machine Effects on Pipe Coatings for Offshore Lines", *Pipeline Industry*, pages 58-60, March, 1969; U.S. Pat. Nos. 3,955,600; 921,354; 868,785; 1,892,433; 2,102,969; 3,761,557.

SUMMARY OF THE INVENTION

According to the present invention, a method is provided for preventing sliding of a weight jacket on a pipe during tensioning of the pipe comprising disposing at least one spiral gripping means about the pipe, attaching at least one end of the gripping means to the pipe, and applying the weight jacket about the pipe and gripping means. Preferably, the pipe is corrosion coated.

Another method of the invention provides for tensioning of the pipe comprising applying tension to a weight jacket which is disposed about a spiral gripping means which is in turn disposed about the pipe and attached thereto in at least one location, transmitting the tensioning through the weight jacket to the spiral gripping means, causing the spiral gripping means to elongate in the axial direction of the pipe and reduce in diameter, increasing the slide resistance between the pipe and the gripping means as the gripping means is reduced in diameter, and transmitting tension into the pipe through the gripping means. Preferably, the pipe is corrosion coated.

The weighted pipe of this invention comprises a pipe having a spiral gripping means disposed thereabout and attached to the pipe in at least one location, and a weight jacket about the pipe and gripping means. Preferably, the pipe is steel and may be corrosion coated.

DESCRIPTION OF PREFERRED EMBODIMENTS

Figure 1:
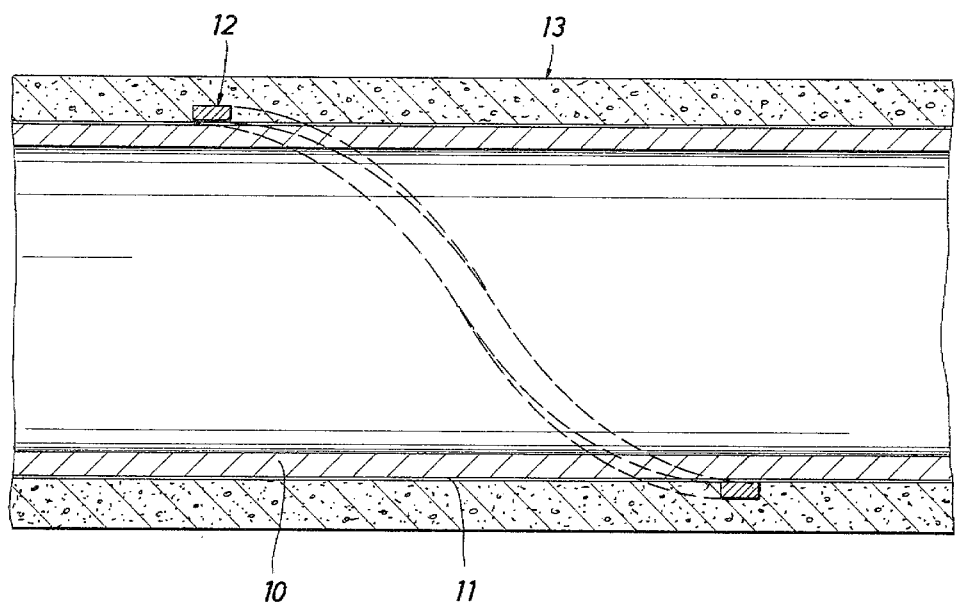
FIG. 1 is a cross-sectional view of the weight jacket over a coated pipe and spirally-wound strap.

The present invention provides a method for preventing the sliding of a weight jacket 13 over a corrosion coating 11 on a pipe 10. This is accomplished by wrapping, in a spiral, one or more bars 12 (or rods, cables or straps of metal or polymeric material) around the pipe 10 just prior to the application of the weight jacket 13, e.g., a concrete jacket. The bars 12 (or rods, cables or straps) are tack welded with welds 20 or otherwise attached to the pipe 10 at the weight jacket cutbacks 14 on each end. It is not necessary to attach the bars 12, etc. to the corrosion coating previously applied to the pipe, since the spiral wrapping pattern causes them to tighten with longitudinally applied stresses, particularly if attached at the pipe end.

FIG. 1 discloses the relation in the present invention between the weight jacketed pipe, pipe coating and spirally wound strap. The pipe 10 has a polymeric coating 11 or any other suitable corrosion-resistant coating thereabout, and the spirally wound strap, rod or bar 12 is in contact with the coating. If there is no corrosion coating, the spirally wound strap, rod or bar is in contact with the pipe. About the coating, if there is one, and encapsulating the spirally wound strap, is a weight jacket 13, e.g. concrete.

The obstacle to sliding presented by these spirally wrapped gripping means is considerable. Further, they do not interfere with pipe laying procedures, and are relatively easy and inexpensive to apply.

Figure 2:
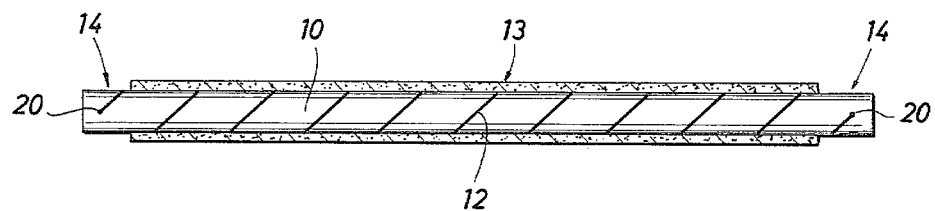
FIG. 2 is an overall view of the coated pipe as shown in FIG. 1 with cutback sections at both ends of the pipe.

FIG. 2 discloses an overall view of the pipe as disclosed in FIG. 1. The concrete weight jacket 13 is cut back at both ends of the pipe and the spirally-wound strap 12 is attached at the ends of the pipe at points 13, for example, by welding. Thus, as tension increases on the pipe, thereby preventing the weight jacket from slipping over the pipe and damaging the polymeric coating or causing the loss of the weight jacket.

Figure 3:
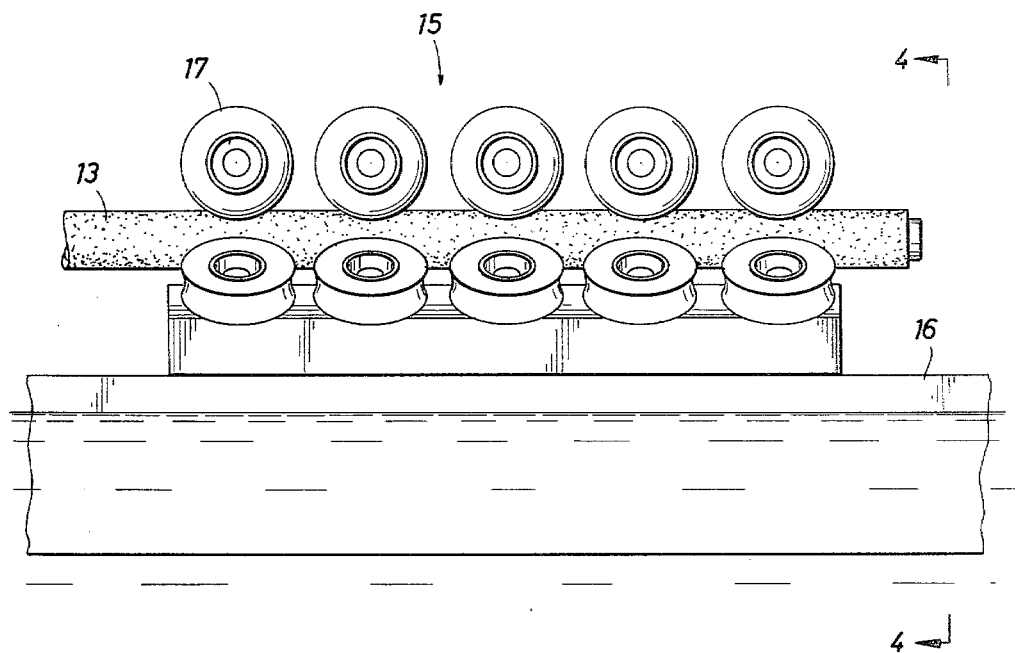
FIGS. 3 and 4 provide views of a weight jacketed pipe having tensioning applied to the jacket.
Figure 4:
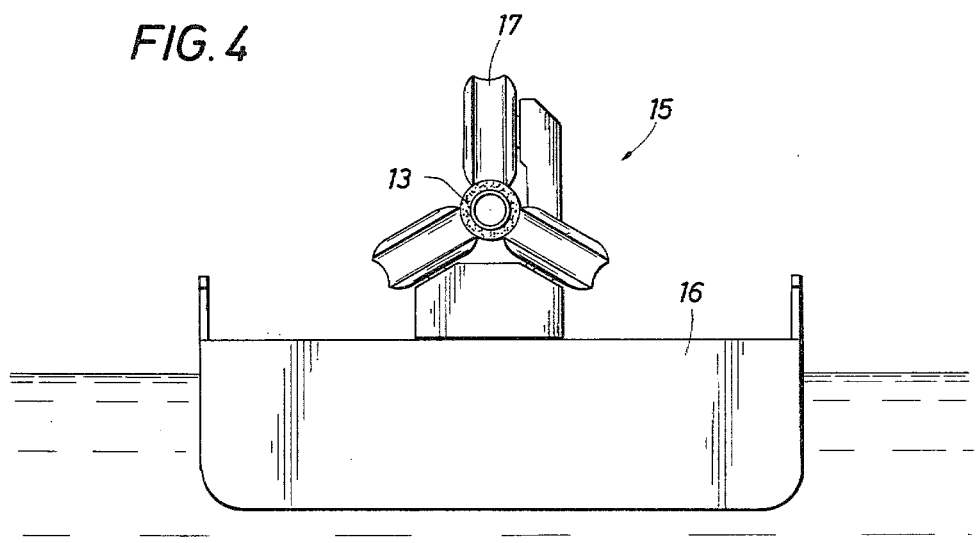

FIGS. 3 and 4 disclose a weight jacketed pipe being laid offshore from a pipelay vessel 16 with tensioning equipment 15 such as disclosed in the *Pipeline Industry* article, cited supra. The concrete weight jacket 13 provides sufficient weight to cause the metal pipe 10 to sink and lay properly on the ocean floor. As described in the *Pipeline Industry* article, the tension machine 15 has three sets of five hydraulically powered wheels 17 arranged in a triangular configuration.

What is claimed is:

1. A method for laying offshore a metal pipe having a corrosion coating and preventing sliding of a weight jacket on the pipe during tensioning of the pipe, comprising:

disposing at least one spirally wound bar gripping means about the coated pipe;

attaching the gripping means to each end of the coated pipe;

applying the weight jacket about the coated pipe and gripping means; and laying the pipe offshore under tension applied to the weight jacket.

2. The method of claim 1, wherein the corrosion coating is polymeric, the weight jacket is concrete which is cast in situ about the pipe and gripping means, and the gripping means is attached to the pipe by welding.

3. An offshore pipeline comprising connected, corrosion coated metal pipes having spirally wound bar gripping means disposed thereabout and attached to the ends of each pipe, and a weight jacket about the coated pipes and gripping means.

4. The weighted pipe of claim 3, wherein the corrosion coating is polymeric and the weight jacket is concrete.

5. A method for tensioning a pipe having a corrosion coating and weight jacket, comprising:

applying tensioning to the weight jacket which is disposed about a spirally wound bar gripping means which is, in turn, disposed about the corrosion coated pipe and attached thereto at each end;

transmitting the tensioning through the weight jacket to the spiral gripping means causing the spiral gripping means to elongate in the axial direction of the coated pipe and increasing the slide resistance between the coated pipe and the gripping means as the gripping means is caused to reduce in diameter; and, transmitting tension into the coated pipe through the gripping means.

6. The method of claim 5, wherein the pipe, gripping means and weight jacket are made up on shore, and the pipe is then towed offshore by tensioning applied to the weight jacket.

7. The method of claim 5, wherein tensioning is applied to the weight jacket as the pipe is deployed offshore from a vessel.

* * * * *